(12) United States Patent
Zhou et al.

(10) Patent No.: US 9,435,108 B2
(45) Date of Patent: Sep. 6, 2016

(54) SHOWERHEAD OR AERATOR CONTAINING PRESSURE COMPENSATION DEVICE (75) Inventors: Huaqiang Zhou, Xiamen (CN); Yaojin Guo, Xiamen (CN)

(73) Assignee: Niagra Energy Conservation Products (Xiamen) Co., Ltd. (CN)

( * ) Notice: Subject to any disclaimer, the term of this patent is extended or adjusted under 35 U.S.C. 154(b) by 281 days.

(21) Appl. No.: 13/882,830

(22) PCT Filed: Nov. 2, 2011

(86) PCT No.: PCT/IB2011/002908
§ 371 (c)(1),
(2), (4) Date: Oct. 24, 2013

(87) PCT Pub. No.: WO2012/059817
PCT Pub. Date: May 10, 2012

(65) Prior Publication Data
US 2014/0124599 A1 May 8, 2014

(30) Foreign Application Priority Data
Nov. 2, 2010 (CN) .................... 2010 2 0597543 U (51) Int. Cl.
*E03C 1/08* (2006.01)
*E03C 1/084* (2006.01)
*E03C 1/086* (2006.01)
(Continued)

(52) U.S. Cl.
CPC ................ *E03C 1/086* (2013.01); *E03C 1/08* (2013.01); *F16K 17/22* (2013.01); *F16K 17/28* (2013.01); *G05D 7/012* (2013.01); *E03C 2001/026* (2013.01)

(58) Field of Classification Search
CPC .... G05D 7/0106; G05D 7/012; F16K 17/20; F16K 17/22; F16K 17/28; F16K 17/34; E03C 1/08; E03C 1/086; E03C 2001/026; B05B 1/18
See application file for complete search history.

(56) References Cited

U.S. PATENT DOCUMENTS 2,593,315 A * 4/1952 Kraft ...................... G05D 7/012
138/45
2,941,544 A * 6/1960 Peras .................... F16K 15/144
137/493

(Continued)

FOREIGN PATENT DOCUMENTS

CH   WO 2009062997 A1 *  5/2009 ............. G05D 7/012
CN        2263140 Y       9/1997
(Continued)

OTHER PUBLICATIONS

International Search Report and Written Opinion for Application No. PCT/IB2011/002908 dated Apr. 26, 2012.

*Primary Examiner* — Darren W Gorman
(74) *Attorney, Agent, or Firm* — Lerner, David, Littenberg, Krumholz & Mentlik, LLP (57) ABSTRACT

Pressure compensators for stabilizing the flow of water are disclosed including at least one flow orifice (10) passing through a pressure compensator body (1) and at least one flexible flow controller (2) which can at least partially block the orifice (10) to provide it with a predetermined flow area whereby the flow controller flexes and reduces the flow area at increased water pressures. Flow controllers are also disclosed for controlling the flow of water including a revolving body (5) for selectively opening and closing a number of flow openings (17) therethrough.

13 Claims, 9 Drawing Sheets

(51) Int. Cl.
*F16K 17/22* (2006.01)
*F16K 17/28* (2006.01)
*F16K 17/34* (2006.01)
*G05D 7/01* (2006.01)
*E03C 1/02* (2006.01)

(56) References Cited

U.S. PATENT DOCUMENTS

| | | |
|---|---|---|
| 6,065,498 A | 5/2000 | Campau |
| 7,252,248 B2 | 8/2007 | Cutler |
| 7,543,763 B1 | 6/2009 | Wu |
| 2010/0319784 A1* | 12/2010 | Kuhne ............... G05D 7/012 137/12 |

FOREIGN PATENT DOCUMENTS

| | | |
|---|---|---|
| CN | 101371207 A | 2/2009 |
| CN | 201537541 U | 8/2010 |
| CN | 201720144 U | 1/2011 |
| CN | 201909076 U | 7/2011 |
| DE | 29810078 U1 | 10/1999 |
| JP | 11182706 A | 7/1999 |
| WO | 2011006082 A1 | 1/2011 |

* cited by examiner

SHOWERHEAD OR AERATOR CONTAINING PRESSURE COMPENSATION DEVICE

CROSS-REFERENCE TO RELATED APPLICATIONS

The present application is a national phase entry under 35 U.S.C. §371 of International Application No. PCT/IB2011/002908 filed Nov. 2, 2011, published in English, which claims priority from Chinese Application No. 201020597543.3, filed on Nov. 2, 2010, all of which are incorporated herein by reference.

FIELD OF THE INVENTION

The present invention relates to flow compensators. More particularly, the present invention relates to miniature flow or pressure compensators which are used as water saving devices. Still more particularly, the present invention relates to pressure compensators which are capable of maintaining flow rates in the face of changes in water pressure in devices such as showerheads and kitchen aerators.

BACKGROUND OF THE INVENTION

As various energy resources become rarer, such as, for example, water resources, the public has become far more conscious of the need for energy savings, as well as the need for environmental protection. Thus, water saving products have been widely accepted in various areas. As an example, water saving aerator devices are now used far more frequently in the daily life of the public than has previously been the case. On the other hand, however, the present state of the art can only realize water savings by limiting the water flow rate, but has not been fully able to maintain stable flow rates under changing water pressures, and thus their water saving efficiency has not been fully satisfactory.

It has been known to employ flow compensators in devices such as kitchen aerators. For example, the assignee of the present application is also the assignee of U.S. Pat. No. 7,252,248 ("the '248 patent"), the entire disclosure of which is incorporated herein by reference thereto. This patent discloses a faucet aerator which incorporates a flow compensator to permit higher flow rates of water at lower water pressures flowing through the aerator itself. The flow compensator shown in the '248 patent is mounted in the flow path of the water through the aeration device and includes a plurality of spaced-apart water openings for the flow of water therein.

Other liquid control devices are known in the art such as that of U.S. Pat. No. 6,065,498. This patent includes a flow control device which provides variable resistance to liquid flow through a flow passage. In this device, however, a vortex flow path is used within a generator as the liquid flows into a housing so that as the inlet pressure increases the flow of water decreases therein.

In addition, in co-pending International Application No. PCT/US2010/041551, the disclosure of which is incorporated herein by reference thereto, a pressure compensator for stabilizing a flow of water is described which includes a rubber body, water compensating channels around the periphery of the body, and flow orifices through the body for controlling the flow rate of the water at various water pressures therein.

The search, however, has continued for improved small size pressure compensators for use in flow controllers, such as aerators of various types. Furthermore, the search has also continued for improved flow controllers which can demonstrate constant flow rates at a variety of different overall flow rates.

SUMMARY OF THE INVENTION

In accordance with the present invention, these and other objects have now been realized by the discovery of a pressure compensator for stabilizing a flow of water comprising a pressure compensator body including an upper surface, a lower surface and an outer periphery, at least one flow orifice passing through the pressure compensator body from the upper surface to the lower surface thereof, and at least one flexible flow control member capable of at least partially blocking the at least one flow orifice to provide the at least one flow orifice with a predetermined flow area, whereby the at least one flexible flow control member is caused to flex and reduce the predetermined flow area at increased water pressures. Preferably, the pressure compensatory includes a plurality of the flow orifices and a corresponding plurality of the flexible flow control members.

In accordance with one embodiment of the pressure compensator of the present invention, the at least one flexible flow control member comprises plastic.

In accordance with another embodiment of the pressure compensator of the present invention, the at least one flexible flow control member comprises a single flexible flow control flap. In another embodiment, however, the at least one flexible flow control member comprises a plurality of flexible flow control flaps.

In accordance with one embodiment of the pressure compensator of the present invention, the at least one flexible flow control member projects upwardly from the upper surface of the pressure compensator body.

In accordance with another embodiment, the flexible flow control member extends substantially horizontally above the upper surface of the pressure compensator body and across the at least one flow orifice.

In accordance with one embodiment of the pressure compensator of the present invention, the plurality of flexible flow control flaps comprises two flexible flow control flaps, in another embodiment three flexible flow control flaps, and in yet another embodiment four flexible flow control flaps. In a preferred embodiment, the plurality of flexible flow control flaps extend upwardly from the upper surface of the pressure compensator body in a substantially pyramidal shape.

In accordance with another embodiment of the pressure compensator of the present invention, a notch is provided on the outer periphery of the pressure control compensator body.

In accordance with a preferred embodiment of the pressure compensator of the present invention, the pressure compensator body comprises plastic or other elastic materials.

In accordance with the present invention, a flow controller for controlling the flow of water from a water source such as a showerhead or aerator is provided comprising an upper housing body for attaching the flow controller to the water source, a revolving housing body rotatably engaged with the upper housing body, a lower housing body affixed to the revolving housing body for rotation therewith, a central axis body disposed within the upper housing body and affixed to the revolving housing body for rotation therewith, and a pressure compensator mounted on the central axis body and affixed to the upper housing body, the pressure compensator comprising a pressure compensator body including an upper surface, a lower surface, and an outer periphery, a plurality of flow orifices passing through the pressure compensator body from the upper surface to the lower surface thereof, a corresponding plurality of flexible flow control members capable of at least partially blocking the plurality of flow orifices to provide the plurality of flow orifices with the predetermined flow areas, whereby the plurality of flexible flow members are caused to flex and reduce the predetermined flow area at increased water pressures, the central axis body including a corresponding plurality of flow openings and a flow blocking surface, whereby upon rotation of the revolving housing body and a central axis body the flow blocking surface can selectively block the flow in predetermined ones of the plurality of flow orifices to alter the total flow of water through the flow controller.

In accordance with one embodiment of the flow controller of the present invention, the revolving housing body includes threads and the lower housing body includes complementary threads for affixing the revolving housing body to the lower housing body.

In accordance with another embodiment of the flow controller of the present invention, the outer periphery of the pressure compensator includes a descending skirt portion, including a slot or notch therein, and the upper housing body includes an inner surface including a projection thereon for mating engagement with the slot or notch, thereby preventing relative rotation or movement between the pressure compensator body and the upper housing.

In accordance with another embodiment of the flow controller of the present invention, the plurality of flow orifices comprises three flow orifices and the corresponding plurality of flexible flow control members comprises three flexible control members.

In accordance with another embodiment of the flow controller of the present invention, the revolving housing body includes a gear pin enclosure affixed to the inner surface thereof, including a gear pin opening, and including a gear spring disposed within the gear pin opening and a gear pin juxtaposed with the gear spring for urging the gear pin out of the gear pin opening, and wherein the upper body includes an outer wall including a plurality of indentations, whereby upon rotating the revolving body the gear pin engages each of the plurality of indentations for temporarily retaining the revolving housing body at one of a plurality of preselected locations corresponding to location of the flow blocking surface.

BRIEF DESCRIPTION OF THE DRAWINGS

The present invention may be more fully appreciated with reference to the following detailed description, which in turn refers to the Figures in which.

DETAILED DESCRIPTION

The primary object of the pressure compensators of the present invention in improving over the prior art is to maintain flow rates as water pressure changes. Thus, within a certain predescribed range of pressure variations the flow rate can now be maintained in order to stabilize the water saving effects realizable with these devices.

The pressure or flow compensators of the present invention are dynamically operated devices which determine the flow rate passing therethrough by flexing or compressing as the water pressure increases. That is, at low water pressures flowing therethrough, the compensator is in a relaxed position, permitting the maximum allowable flow of water therethrough.

As the water pressure increases, however, the flexible flow control member begins to flex, therefore reducing the total flow area through the flow orifice, thus reducing the amount of water flowing therethrough. In this manner, the flow compensator can be designed to maintain its rated flow rate generally between pressures of from about 10 to 100 psi, and preferably from about 20 to 80 psi. As the flexible flow control member continues to flex, the channels through which the water passes are reduced, again allowing the constant flow rate to be maintained therein. In one embodiment the flexible flow control members in their normal or relaxed position prior to initiation of flow of water thereonto do not block the openings of the flow orifices at all. Then, upon application of increasing water flow the flow control members flex and begin to block a part of the flow orifice. In a preferred embodiment, the flow control members upon flexing can block up to about 50% or 60% of the openings of the flow orifices, and in some cases even more.

In order to meet these requirements, the pressure compensators of the present invention are preferably made of an elastic material which has good elastic properties, such as various plastic compounds. Thus, it is most desired to use a plastic compound which has a desired degree of flexibility.

Examples of the plastic compounds which are preferred for use in accordance with the present invention include the following: polyoxymethylene (POM), acrylonitrile butadiene styrene (ABS) including up to 30 weight percent polycarbonate, and polyoxymethylene including up to 25 weight percent glass fiber. Polyoxymethylene is the most preferred plastic compound for use in connection herewith.

The particular configuration and shape of the flow compensators of the present invention, particularly as compared to prior art flow compensators, greatly increases the utility and versatility of these products. In particular, they can now provide for control of flow rates even lower than those which are applicable to prior art products, which are generally limited to minimal flow rates of about 1 and 1.25 gallons per minute. The pressure compensator devices of the present invention, on the other hand, can handle various flow rates including flow rates of 0.5, 1.0, 1.5, 2.0, and 2.5 gallons per minute, and the like.

The pressure compensators of the present invention can also be employed in connection with a flow controller such as a showerhead or aerator for attachment to a faucet or the like. In this case, a number of pressure compensators are utilized, and a preferred flow controller is utilized in which the total flow rate through the flow controller can be altered by permitting the water to flow through one or more of the plurality of pressure compensator devices in a selective matter. The details of such a device are set forth herein.

Figure 1:
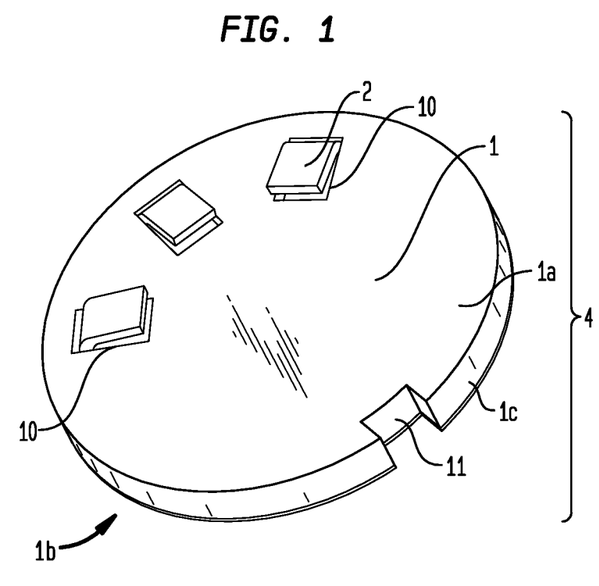
FIG. 1 is a side, perspective view of a pressure compensator in accordance with the present invention including three flow control members.

Referring to FIG. 1, the miniature flow compensator 4 includes a pressure compensator body 1 which is generally circular or disk-shaped, but which can be of other shapes, such as oval or square, or rectangular, or the like. The pressure compensator body itself is preferably made of plastic as discussed above. It includes an upper, preferably flat surface 1a, an outer peripheral wall 1c, and a bottom surface 1b. The bottom surface 1b can be indented from the bottom edge of the peripheral wall 1c or it can include a thickness corresponding to the outer peripheral wall 1c. In the embodiment shown in FIG. 1, a number of flow orifices 10 extend through the pressure compensator body 4 from the upper surface 1a to the lower surface 1b thereof. Extending above the upper surface 1a of the pressure compensator itself and associated with each of these orifices 10 are flaps 2. These are preferably unitary with the pressure compensator body such as being hinged at one end thereof and blocking at least a portion of the surface area of the flow orifice 10. Furthermore, since the flap 2 is made of flexible plastic material, it can bend in the face of increased flow pressure against the upper surface 1a of the pressure compensator. This flexibility will allow the flap 2 to move downwardly to further close off the orifice 2 and allow less water to flow through the orifice 10. Thus, the overall area of flow into the orifice 10 is reduced at increased pressure.

The outer periphery 1c of the pressure compensator body includes at least one notch 11 as shown therein. The purpose of this notch 11 will be seen more clearly below in the discussion of the pressure compensator incorporated into a flow controller such as a showerhead or aerator or the like. Thus, such a notch will act in connection with a protrusion on the upper body of the aerator or showerhead in order to fix the position of the pressure compensator relative to the upper body of the flow control device. In this manner, when the central axis body or lower portions of the flow controller are rotated, selected ones of the flow orifices can be blocked by the device discussed below. The notches themselves can be of various shapes and designs including square, rectangular, semicircular, semi-oval, or the like and more than one notch can be utilized such as two or three notches intended to cooperate with additional protrusions in the device in which they are utilized.

Figure 2:
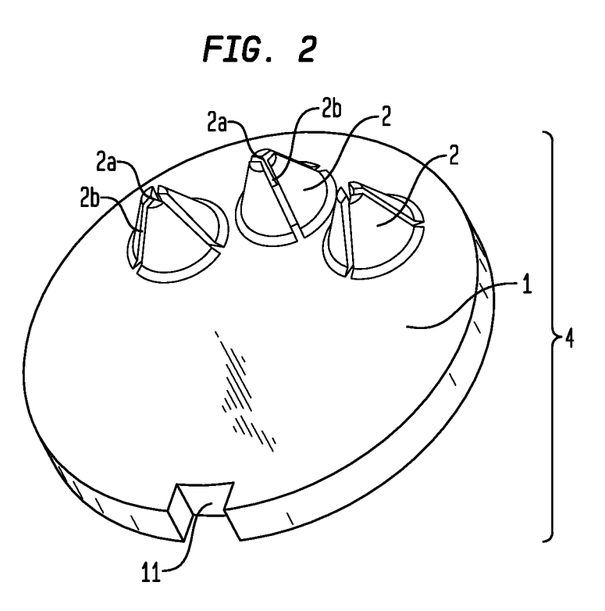
FIG. 2 is a side, perspective view of another pressure compensator in accordance with the present invention, including three flow control members.

Turning to FIG. 2, another embodiment of the pressure compensator of the present invention is disclosed. In the embodiment shown in FIGS. 1 and 2, three flow orifices 10 are shown. It is, of course, possible to use more or less of these flow orifices, depending on the specific use of the device in question.

In the case of the pressure compensator shown in FIG. 2, the flow orifices are at least partially covered by a series of flaps 2, in this case three flaps having a pyramidal configuration as shown therein. More flaps 2 may be utilized, such as four flaps covering the flow orifices. Thus, in a relaxed state water can flow downwardly onto the upper surface 1a of the pressure compensator body 1 through the opening at the top into flow orifices 10 between the three flaps 2, and in the peripheral slits 2b between the flaps 2. Once again, the flaps 2 are preferably unitary with the overall pressure compensator 1 and are made of plastic. Thus, upon increasing the water pressure for the stream of water flowing downwardly onto the upper surface 1a of the pressure compensator 1, the flaps 2 can flex inwardly to reduce the flow area into the flow orifice 10 by reducing the distances between the flaps 2b and in the upper opening 2a thereof.

Figure 3:
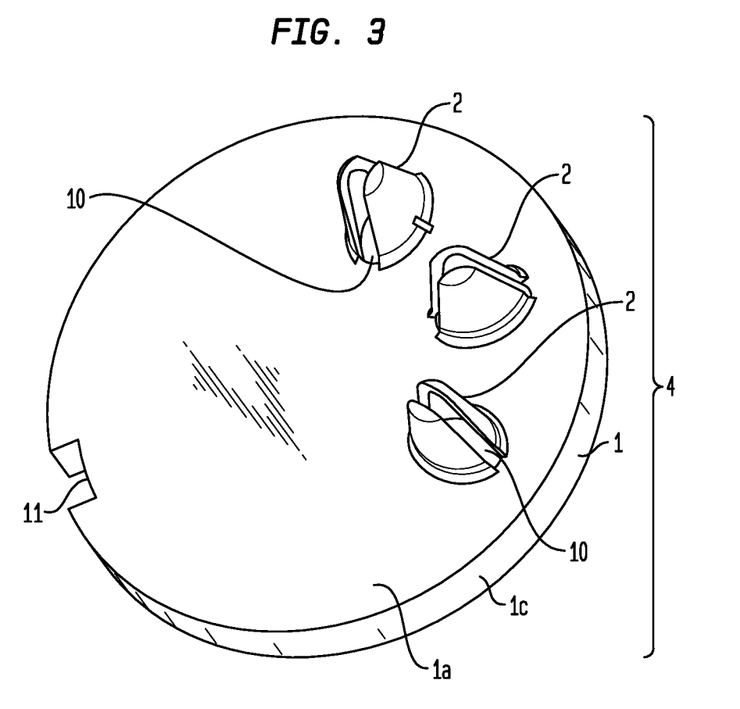
FIG. 3 is a side, perspective view of another pressure compensator in accordance with the present invention with three flow control members.
Figure 4A:
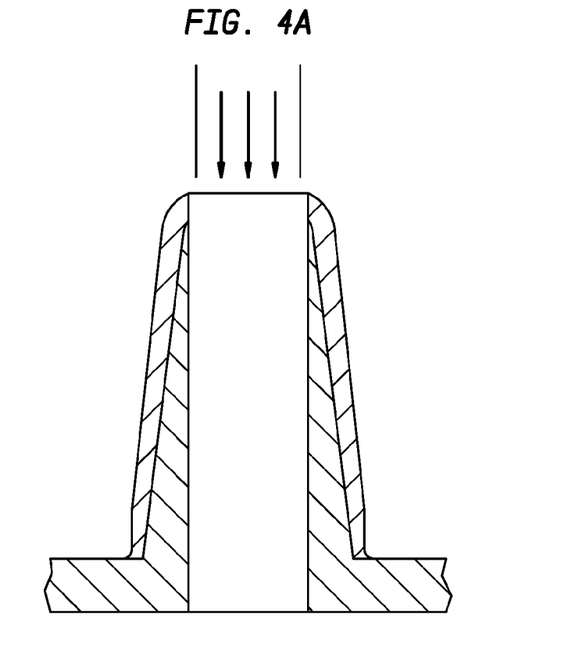
FIG. 4A is an enlarged, side, elevational, partial sectional view of one of the flexible flow control members of the present invention shown with a predetermined flow rate thereon.
Figure 4B:
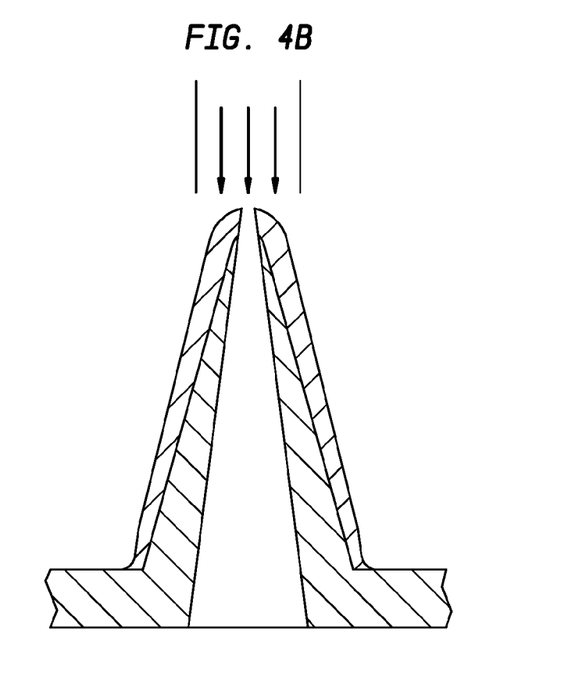
FIG. 4B is an enlarged, side, elevational, partial sectional view of the flexible flow control member shown in FIG. 4A, but with an increased flow rate thereon.

A similar embodiment is shown in FIG. 3, but in this case only two flaps 2 are included with respect to each of the flow orifices 10 thereof. In this embodiment, reference is made to FIGS. 4A and 4B in order to illustrate operation of the flexible flow members as shown in FIG. 2. Thus, in FIG. 4A the initial relaxed position of the flexible flow controller members is shown in which the water pressure is minimal and the flow of water is essentially unimpeded through the center of the flow control members. However, as shown in FIG. 4B, as the water pressure increases downwardly the flexible flow controls members are forced inwardly together thus decreasing the area for flow through the flow control members. This, of course, reduces the volume of flow at this increased pressure thus maintaining the overall flow rates therein.

Figure 5:
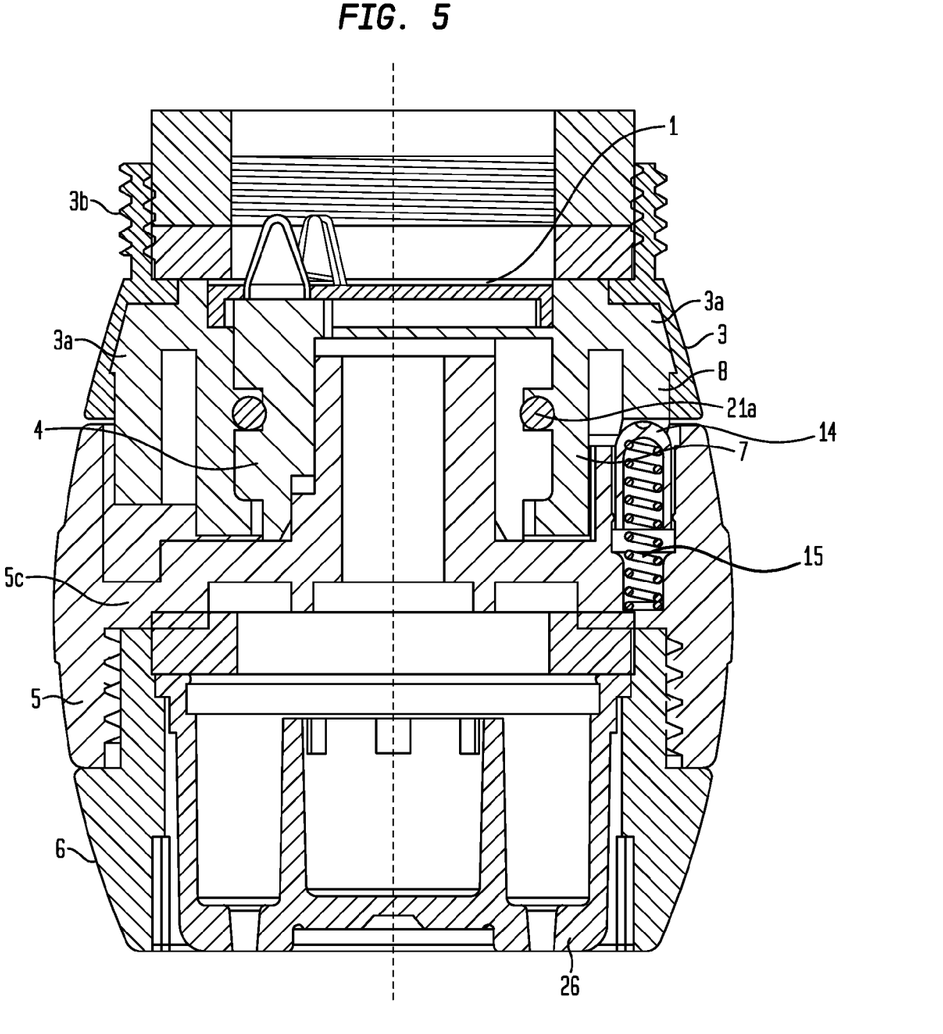
FIG. 5 is a side, elevational, sectional view of an aerator including a pressure compensator in accordance with the present invention.
Figure 6:
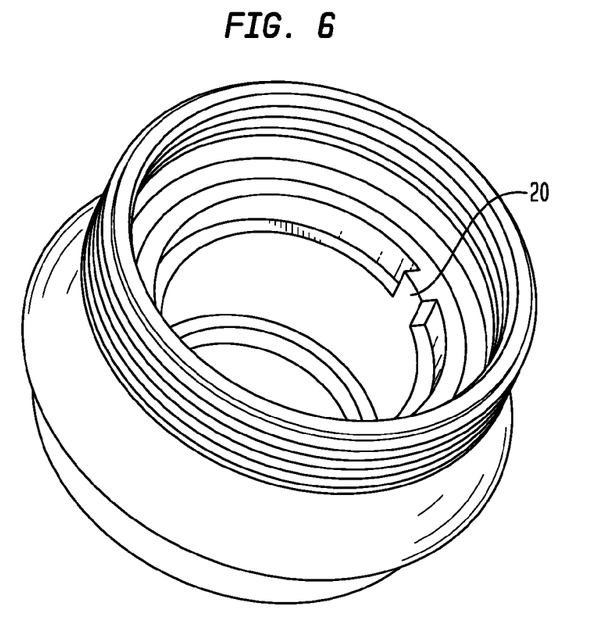
FIG. 6 is a top, perspective view of an upper body for use in connection with the aerator including a pressure compensator in accordance with the present invention.
Figure 7:
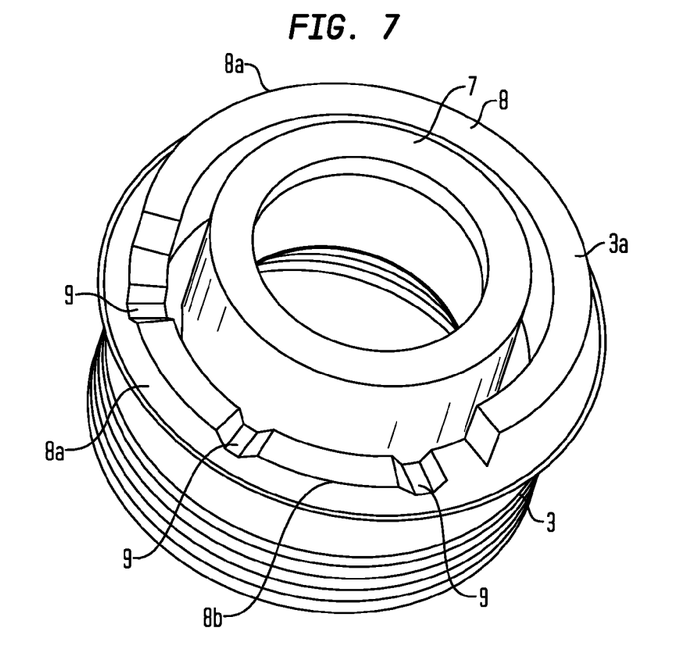
FIG. 7 is a bottom, perspective view of the upper body shown in FIG. 6.
Figure 12:
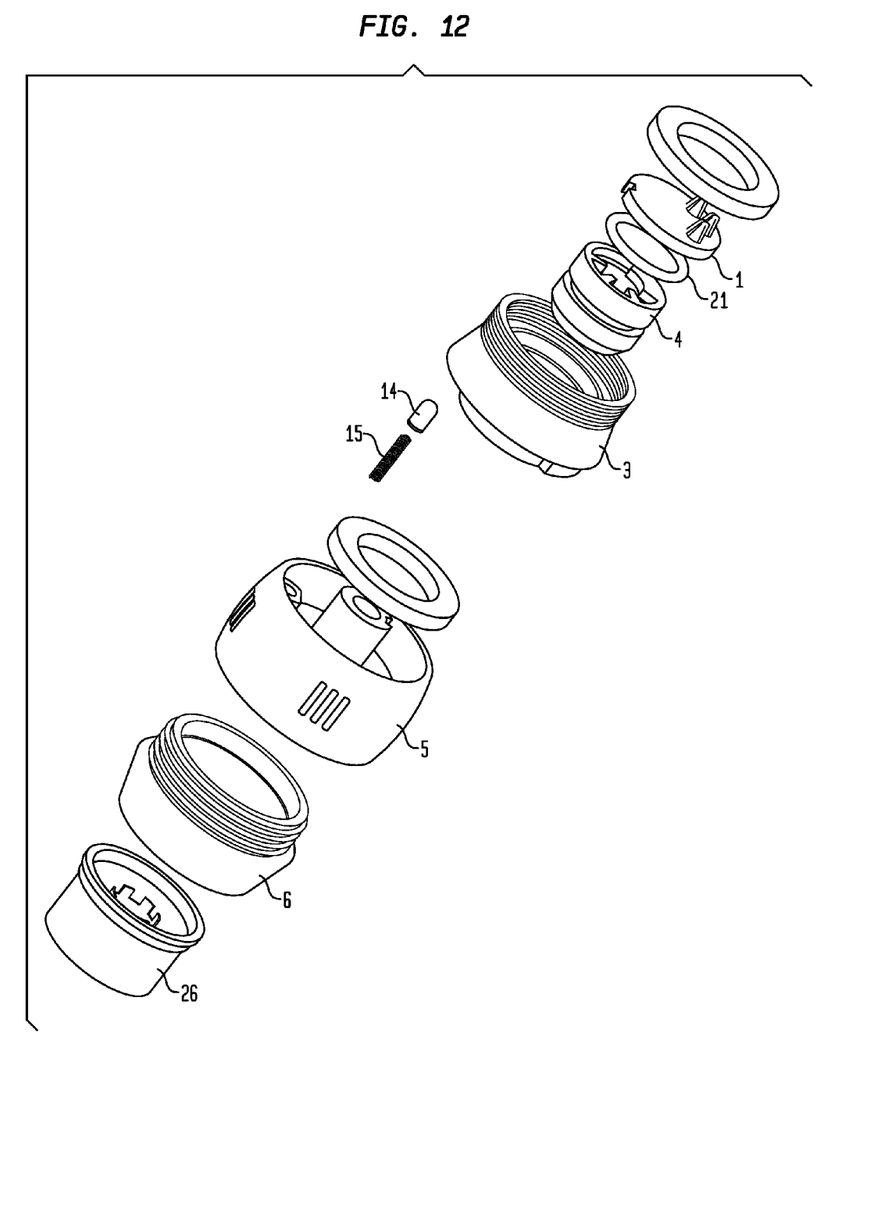
FIG. 12 is a side, perspective, exploded view of an aerator shown in FIG. 5 including a pressure compensator in accordance with the present invention.

Turning to FIG. 5, application of the pressure compensators of the present invention to a flow controller, such as an aerator or showerhead, are referenced. The flow controller shown in FIG. 5 is also shown in exploded form in FIG. 12. The flow controller includes an upper body 3 which incorporates a joint body portion 3a which can thus be seen in FIGS. 6 and 7. The upper body 3 includes an upper threaded portion 3b which is intended to threadably engage a faucet or other water source or outlet. Viewing the upper body 3 from its lower end as shown in FIG. 7, it can be seen that joint body portion 3a fixedly mounted thereon includes a central inner cylindrical portion defined by inner wall 7. This will be the main conduit for the flow of water through the flow controller itself. This inner wall 7 is attached to outer wall 8 as can be seen in FIG. 5. Outer wall 8 itself includes an upstanding wall portion 8a and a depressed wall portion 8b on one side thereof. Within the depressed wall portion 8b are a series of grooves 9 contained in the depressed wall portion 8b which will be discussed below. Viewing the upper body 3 from its upper end as shown in FIG. 6 reveals the existence of a projection 20 extending from the inner wall thereof. It is this projection 20 which is intended to cooperate with the notch 11 in the pressure compensator discussed above. Their cooperation will be discussed further below.

Figure 10:
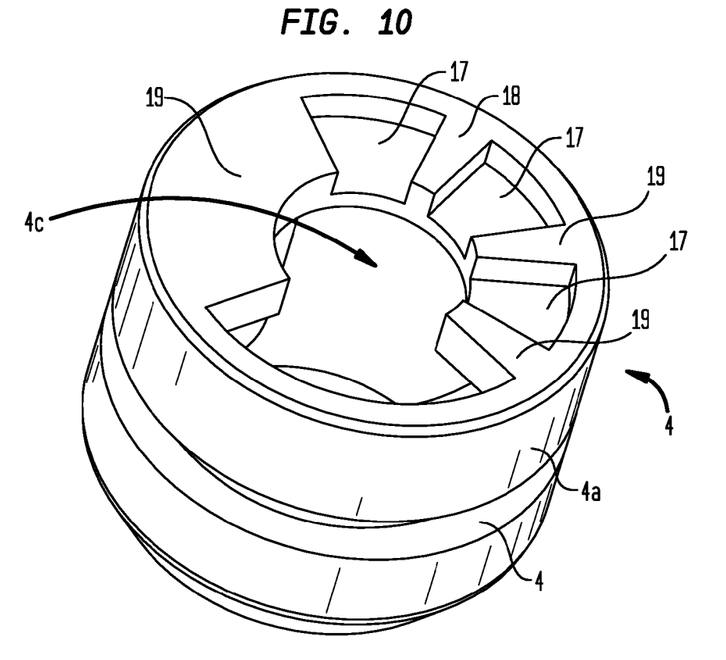
FIG. 10 is a top, perspective view of a central axis body for use in connection with an aerator including a pressure compensator in accordance with the present invention.
Figure 11:
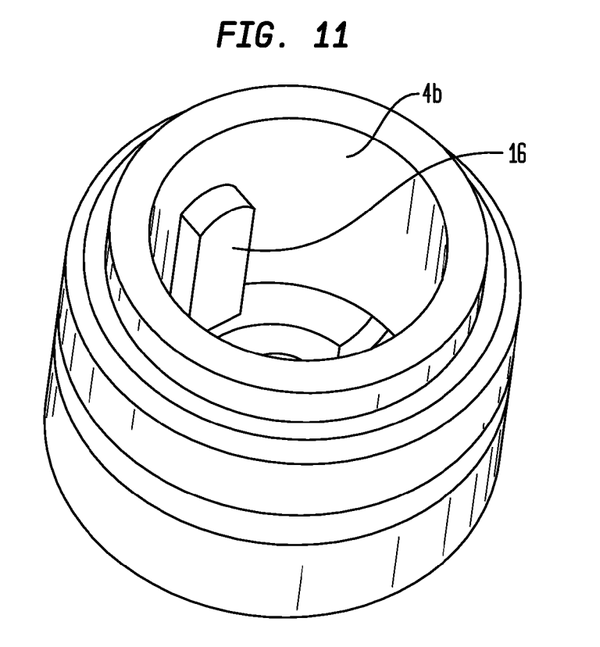
FIG. 11 is a bottom, perspective view of the central axis body shown in FIG. 10.

Mounted for rotation within the upper body 3 is central axis body 4 which is best seen in FIGS. 10 and 11. Central axis body 4 thus includes an outer wall 4a and an inner wall 4b. Viewing central axis body 4 from its upper end as shown in FIG. 10 reveals that its upper surface includes a central aperture partially surrounded by arcuate upper wall portion 19. This is an arc-shaped solid wall surrounding the central aperture 4c partially as shown therein. The arcuate top wall portion 19, however, includes a series of slots 17 therein. Each of these slots 17 is separated by extensions 18 of the arcuate top wall portion 19. The outer wall 4a of the central axis body 4 includes a depressed area 21 which is intended to contain an O ring 21a as seen in FIG. 5.

In viewing the central axis body 4 from its lower end as seen in FIG. 11, along the inner wall 4a is included a raised portion 16 extending longitudinally along the inner wall 4b thereof. The purpose of this raised portion 16 will be discussed further below.

Figure 8:
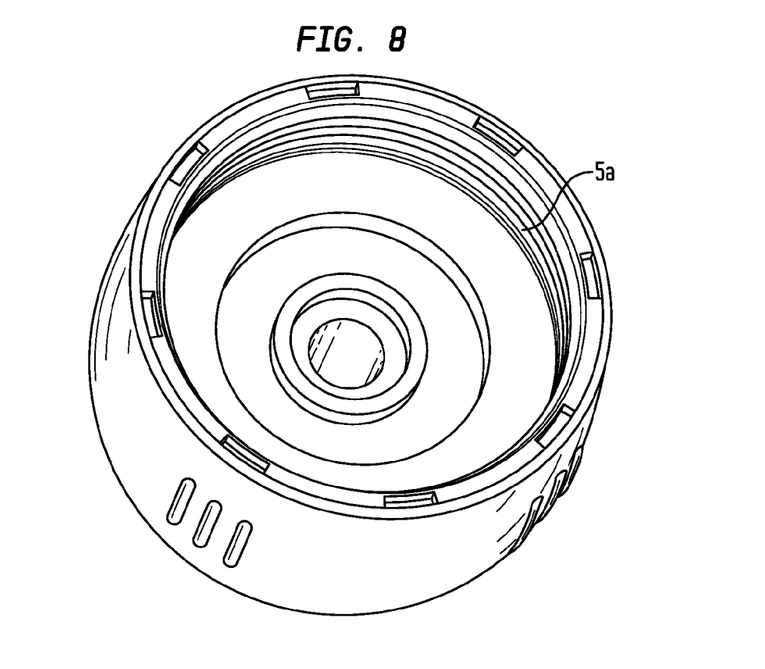
FIG. 8 is a top, perspective view of a revolving body for use in connection with an aerator including a pressure compensator in accordance with the present invention.
Figure 9:
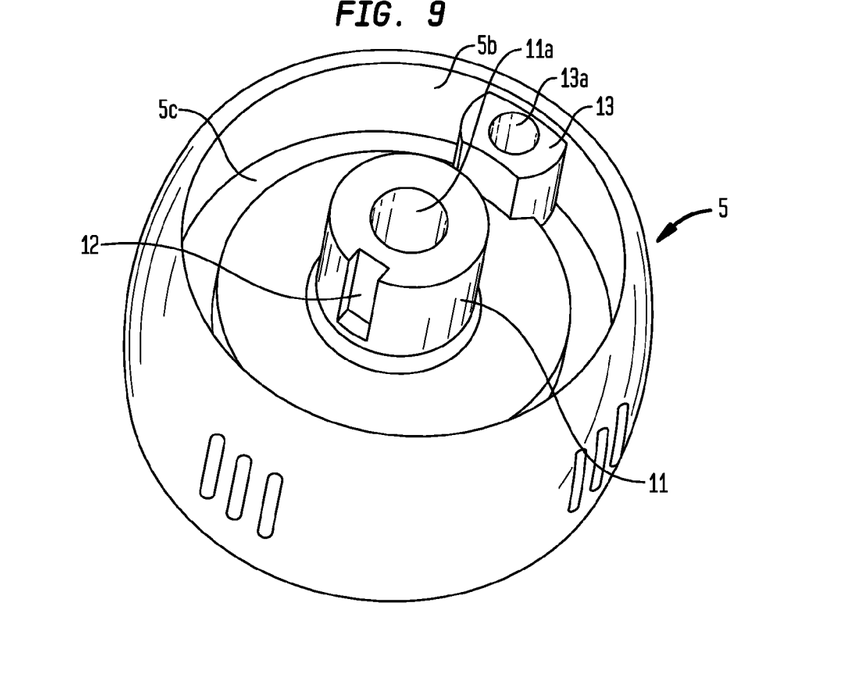
FIG. 9 is a bottom, perspective view of the revolving body shown in FIG. 8.

Below the upper body 3 is contained a revolving body 5 which is rotatably mounted thereon. The revolving body 5 thus includes an outer wall 5a and an upper inner wall 5b. The body of the revolving body 5 includes an extension 5c extending laterally inwardly from the inner wall 5b and forming central shaft 11. Central shaft 11 includes a hollow interior portion 11a which is an extension of the inner portion of the inner wall 7 of the upper body 3 for the flow of water through the flow controller. The outer wall of central shaft 11 includes a slot 12. This slot 12 is intended to correspond in size and shape with a raised portion 16 on the inner wall 4b of the central axis body 4. Thus, with the raised portion 16 maintained in the slot 12 of the central shaft, the rotation of the revolving body 5a will simultaneously cause the rotation of the central axis body 4 therewith. Viewing the revolving body 5 from its lower end as seen in FIG. 8, it can be seen that the inner wall 5b of the lower end includes threads 5d thereon. These threads 5d are intended to mate with corresponding threads 6a on a lower body 6 which can be rotatably attached to the revolving body 5. Mounted within the lower body 6 is a water outflow cover 26 for exit of the stream of water from the flow controller itself.

Returning to the revolving body 5, the inner wall 5b includes on one portion thereof a gear pin enclosure 13. This is a projection extending from the inner wall 5b and including a central aperture 13a therein. This enclosure is intended to include a gear pin 14 and a gear pin spring 15 as seen in FIG. 5. The gear pin spring is thus intended to urge the gear pin 14 upwardly as shown in FIG. 5, and thus towards the bottom surface of the depressed wall portion 8b of the upper body 3, and specifically so that the gear pin 14 can enter temporarily into one of the grooves 9 depending on rotation of the revolving body 5 along with the central axis body 4.

The pressure compensator 1 of this invention is mounted above the upper wall of the central axis body 4 as shown in FIG. 5. For purposes of this example, the pressure compensator corresponds to the pressure compensator such as that shown in FIG. 3 including three flow orifices, each including flexible flow control members or flaps discussed above. Thus, in this embodiment, rotation of the revolving body 5 will permit the gear pin 14 to settle in one of the three grooves 9 so that either one, two or three of the slots 17 in the arcuate top wall portion 19 of the central axis body 4 will be in a location corresponding to one of the three orifices in the pressure compensator. As an example, this will thus refer to flow rates of 0.5, 1.0, and 1.5 gallons per minute. Of course, different flow rates could be applied as well as different numbers of these orifices. In such use, in any event, the pressure compensator is located above the upper body 3 in a position such that water exiting the faucet to which the flow controller is attached will directly impact on the upper surface 1a of the pressure compensator 1 and will therefore flow through either one, two or three of the flow orifices containing the flexible control members hereof at a constant flow rate.

Figure 13:
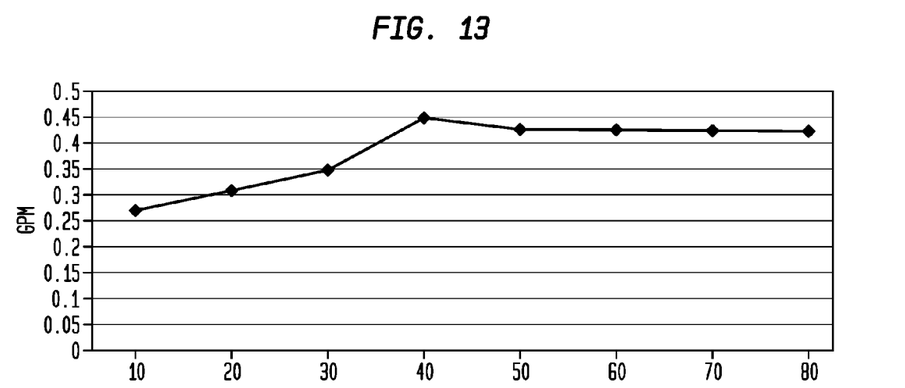
FIG. 13 is a graphical representation demonstrating the change in flow rate with increased water pressure in an aerator including a pressure compensator in accordance with the present invention.

Demonstrative of the flow rates obtainable with a pressure compensator of the present invention, at varying water pressures, reference is made to FIG. 13. In the figure, with the pressure compensator of the type shown in FIG. 3, the actual flow rates obtained at varying water pressures were measured. The gallons per minute measured at water pressures ranging from 10 to 80 psi are shown, and they remain relatively constant irrespective of the actual water pressure applied, particularly to water pressures above about 30 psi.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A pressure compensator for stabilizing a flow of water comprising a pressure compensator body including an upper surface, a lower surface and an outer periphery, a plurality of flow orifices passing through the pressure compensator body from the upper surface to the lower surface thereof, and a plurality of flexible flow control members each capable of at least partially blocking an associated flow orifice to provide the flow orifice with a predetermined flow area, whereby the plurality of flexible flow control members are caused to flex and reduce but not close the predetermined flow area at increased water pressures, wherein each of the plurality of flexible flow control members comprises two flexible flow control flaps that project upwardly from the upper surface of the pressure compensator body.

2. The pressure compensator of claim 1 wherein each of the flexible flow control members comprises plastic.

3. The pressure compensator of claim 1 including a retaining slot on the outer periphery of the pressure compensator body.

4. The pressure compensator of claim 1 wherein the pressure compensator body comprises plastic.

5. A flow controller for controlling the flow of water from a water source comprising an upper housing body for attaching said flow controller to said water source, a revolving body rotatably engaged with said upper housing body, a lower housing body affixed to said revolving body for rotation therewith, a central axis body disposed within said upper housing body and rigidly affixed to said revolving body for rotation therewith, and a pressure compensator mounted on said central axis body and rigidly affixed to said upper housing body, said pressure compensator comprising a pressure compensator body including an upper surface, a lower surface, and an outer periphery, a plurality of flow orifices passing through said pressure compensator body from said upper surface to said lower surface thereof, a corresponding plurality of flexible flow control members capable of at least partially blocking said plurality of flow orifices to provide said plurality of flow orifices with predetermined flow areas, whereby said plurality of flexible flow control members are caused to flex and reduce said predetermined flow area at increased water pressure, said central axis body including a corresponding plurality of flow openings and a flow blocking surface, whereby upon rotation of said revolving body and said central axis body said flow blocking surface can selectively block the flow in predetermined ones of said plurality of flow orifices to alter the total flow of water through said flow controller.

6. The flow controller of claim 5 wherein said revolving body includes threads and said lower housing body includes complementary threads for affixing said revolving body to said lower housing body.

7. The flow controller of claim 5 wherein said outer periphery of said pressure compensator body includes a descending skirt portion, including a slot therein, and wherein said upper housing body includes an inner surface and a projection thereon for mating engagement with said slot, thereby preventing relative rotational movement through said pressure compensator body and said upper housing.

8. The flow controller of claim 5 wherein said plurality of flow orifices comprises three flow orifices and said corresponding plurality of flexible flow control members comprises three flexible flow control members.

9. The flow controller of claim 5 wherein said revolving body includes a gear pin enclosure affixed to the inner surface thereof, including a gear pin opening, and including a gear spring disposed within said gear pin opening and a gear pin juxtaposed with said gear spring for urging the gear pin out of the gear pin opening, and wherein said upper body includes an outer wall including a plurality of indentations, whereby upon rotating of said revolving body said gear pin engages each of said plurality of indentations for temporarily retaining said revolving body at one of a plurality of preselected locations corresponding to locations of said plurality of flow orifices.

10. The pressure compensator of claim 1, wherein each of the flexible flow control members is adapted to flex and reduce the predetermined flow area at increased water pressures in a manner that maintains a substantially constant flow rate through its associated flow orifice.

11. The pressure compensator of claim 1, wherein, in a relaxed state, each of the plurality of flexible flow control members is un-flexed and the predetermined flow area is at a maximum.

12. The pressure compensator of claim 10, wherein each of the flexible flow control members is adapted to maintain a substantially constant flow rate through each flow orifice at pressures of from about 10 to 100 psi.

13. The pressure compensator of claim 1, wherein each of the flexible flow control members is adapted to flex and block up to about 50% or 60% of its associated flow orifice.

\* \* \* \* \*